(12) United States Patent
Stefanelli et al.

(10) Patent No.: US 10,872,480 B2
(45) Date of Patent: Dec. 22, 2020

(54) METHOD, DEVICES AND SYSTEM FOR IMPROVED CONTROL OF A SERVICE MEANS FOR DEDICATED USE IN INFRASTRUCTURES

(71) Applicant: TARGA TELEMATICS S.p.A., Treviso (IT)

(72) Inventors: Carlo Stefanelli, Treviso (IT); Alberto Falcione, Treviso (IT); Nicola De Mattia, Treviso (IT)

(73) Assignee: TARGA TELEMATICS S.p.A., Treviso (IT)

(*) Notice: Subject to any disclaimer, the term of this patent is extended or adjusted under 35 U.S.C. 154(b) by 0 days.

(21) Appl. No.: 16/342,627

(22) PCT Filed: Oct. 17, 2017

(86) PCT No.: PCT/IB2017/001328
§ 371 (c)(1),
(2) Date: Apr. 17, 2019

(87) PCT Pub. No.: WO2018/073642
PCT Pub. Date: Apr. 26, 2018

(65) Prior Publication Data
US 2019/0236875 A1 Aug. 1, 2019

(30) Foreign Application Priority Data
Oct. 17, 2016 (IT) .......................... 102016000104064

(51) Int. Cl.
*G07C 9/00* (2020.01)
*G06F 21/31* (2013.01)
(Continued)

(52) U.S. Cl.
CPC ............ *G07C 9/00309* (2013.01); *B64F 1/32* (2013.01); *G06F 21/31* (2013.01); *G07C 9/27* (2020.01);
(Continued)

(58) Field of Classification Search
CPC ... G07C 9/00309; G07C 9/00103; B64F 1/32; G06F 21/31
See application file for complete search history.

(56) References Cited

U.S. PATENT DOCUMENTS

| 9,373,201 B2 | 6/2016 | Jefferies et al. |
| 9,376,090 B2 | 6/2016 | Gennermann |

(Continued)

FOREIGN PATENT DOCUMENTS

| WO | WO 2005/021340 A1 | 3/2005 |
| WO | WO 2013/133791 A1 | 9/2013 |

OTHER PUBLICATIONS

IT 201600104064, Jul. 14, 2017, Italian Search Report and Written Opinion.
(Continued)

*Primary Examiner* — Nabil H Syed
(74) *Attorney, Agent, or Firm* — Wolf, Greenfield & Sacks, P.C.

(57) ABSTRACT

The present invention relates to a method, devices, and computer program for controlling a semi-movable service means dedicated to a use in airport infrastructures. According to the method, there are envisaged steps of obtaining (S110), in the client device, identification information of a user from an external device; sending (S120), in the client device, a request message to the server device on the basis of the obtained information; performing (S130), in the server device, an authorisation process for the semi-movable means on the basis of the received request message; sending
(Continued)

(S140), in the server device, a response message to the client device on the basis of a result of the authorisation process; and performing (S150), in the client device, a control of the semi-movable means on the basis of the received response message.

16 Claims, 6 Drawing Sheets

(51) Int. Cl.
    *G07C 9/27*     (2020.01)
    *B64F 1/32*     (2006.01)
    *H04L 29/06*     (2006.01)

(52) U.S. Cl.
    CPC .............. *H04L 63/0876* (2013.01); *G05B 2219/36542* (2013.01); *G07C 2009/00547* (2013.01)

(56) References Cited

U.S. PATENT DOCUMENTS

| | | | | |
|---|---|---|---|---|
| 2003/0206102 A1* | 11/2003 | Joao | ............ | B60R 25/102 340/539.1 |
| 2003/0225707 A1* | 12/2003 | Ehrman | ............ | G06Q 10/08 705/64 |
| 2008/0015886 A1 | 1/2008 | Kim et al. | | |
| 2012/0313796 A1* | 12/2012 | Lee | ............ | B60R 25/2018 340/989 |
| 2014/0043141 A1 | 2/2014 | Cazanas et al. | | |
| 2014/0282931 A1 | 9/2014 | Protopapas | | |
| 2016/0055699 A1* | 2/2016 | Vincenti | ............ | H04W 12/04 340/5.61 |
| 2016/0148449 A1 | 5/2016 | God et al. | | |

OTHER PUBLICATIONS

PCT/IB2017/001328, Mar. 2, 2018, International Search Report and Written Opinion.
PCT/IB2017/001328, May 2, 2019, International Preliminary Report on Patentability.
International Search Report and Written Opinion for International Application No. PCT/IB2017/001328 dated Mar. 2, 2018.
International Preliminary Report on Patentability for International Application No. PCT/IB2017/001328 dated May 2, 2019.
Italian Search Report and Written Opinion for Application No. IT 201600104064 dated Jul. 14, 2017.
Dharanya et al., Embedded Based Conveyance Authentication and Notification System. International Journal of Engineering and Technology (IJET). 2013;5(1):410-420. ISSN: 0975-4024.
Makwana et al., Automobile Driver Authentication System using Electronic Driving License. International Journal of Innovative Research in Computer and Communication Engineering. 2016;4(2):1555-9. DOI: 10.15680/JIIRCCE.2016.0402141.

* cited by examiner

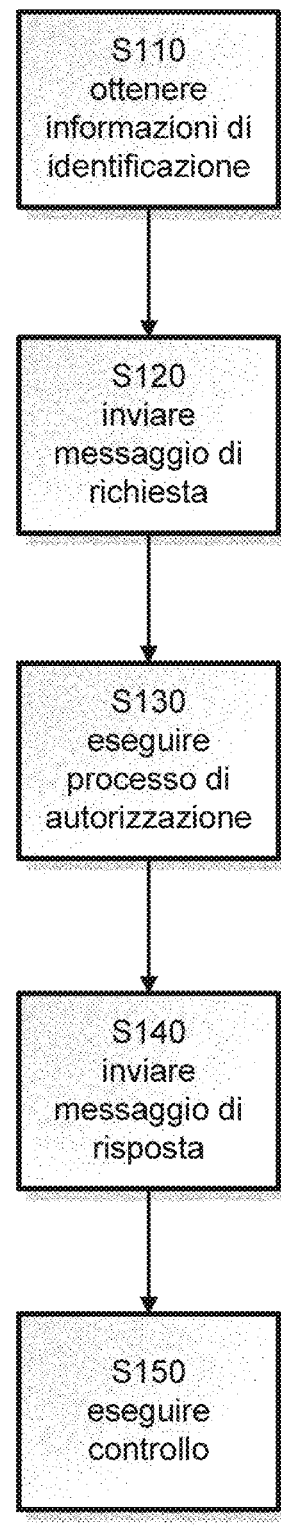

METHOD, DEVICES AND SYSTEM FOR IMPROVED CONTROL OF A SERVICE MEANS FOR DEDICATED USE IN INFRASTRUCTURES

CROSS REFERENCE TO RELATED APPLICATIONS

This application is a U.S. National Stage Entry under 35 U.S.C. § 371 of International Application No. PCT/IB2017/001328, filed in the International Bureau on Oct. 17, 2017, which claims the benefit of and priority to Italian Application No. IT 102016000104064, filed in the Italian Patent Office on Oct. 17, 2016, each of which is incorporated by reference herein in its entirety.

FIELD OF THE INVENTION

The present invention relates to a method, devices, a system and a program for controlling a semi-movable service means dedicated to a use in airport infrastructures.

BACKGROUND OF THE INVENTION

At present, in infrastructures such as airport, railway or port infrastructures, or for the sorting of goods, various service means are used to carry out a plurality of tasks, such as, for example, loading/unloading of cargo, loading/unloading of passengers, cargo conveyance, baggage conveyance, towing of trailers, etc. In the case of an airport infrastructure, said means can comprise specific vehicles, such as, for example, self-propelled stairs and belts, transporters, cargo loaders, tractors, vehicle tow tractors, baggage trailer tow tractors, de-icers, toilet service units, and water service units, etc. FIG. 6 shows an example of some of such service means known in the art.

Within an airport infrastructure, said service means can be used by different users.

Typically, in order to be able to use a means, a user, for example a driver or a worker, can use a key of the means (or also vehicle hereinafter), for example, which allows the doors of the means to be opened/closed and/or enables the engine or motor of the semi-movable means (for example, via the starter motor of the engine, or directly the starting of the electric motor in the case of means with electric traction). Each user authorised to use said means or a number of means will thus be provided with the key.

Use of the means, for example the opening/closing of the doors and/or enabling of the motor, thus takes place in a simple manner.

The aim, therefore, is to improve control of the service means.

SUMMARY OF THE INVENTION

The object of the present invention is to remedy the problems of the known techniques and thus to improve them, for example by providing a better control of semi-movable service means dedicated to use in infrastructures.

According to a first aspect of the invention, there is provided a method for controlling a semi-movable service means dedicated to a use in airport infrastructures in a system (400) comprising a client device (200, 420) and a server device (300, 430), wherein the client device is connected to the semi-movable means, the method comprising the steps of: obtaining (S110), at the client device, identification information of a user from an external user device; sending (S120) a request message from the client device to the server device on the basis of the obtained information; performing (S130), at the server device, an authorisation process for the semi-movable means on the basis of the received request message; sending (S140) a response message from the server device to the client device on the basis of a result of the authorisation process; performing (S150), at the client device, a control of the semi-movable means on the basis of the received response message.

According to a second aspect of the invention, there is provided a client device (200, 420) for controlling a semi-movable service means dedicated to a use in airport infrastructures in a system (400) comprising said client device and a server device (300, 430), said client device being connected to the semi-movable means and comprising: an obtaining means (210) configured to obtain identification information of a user from an external user device; a sending means (220) configured to send a request message to the server device (300, 430) on the basis of the obtained information; a receiving means (230) configured to receive a response message from the server device (300, 430); and a control means (240) configured to perform a control of the semi-movable means on the basis of the received response message.

According to a third aspect of the invention, there is provided a server device (300, 430) for controlling a semi-movable service means dedicated to a use in airport infrastructures in a system (400) comprising said server device and a client device (200, 420), wherein the client device is connected to the semi-movable means, said server device comprising: a receiving means (310) configured to receive a request message from the client device (200, 420), said request message comprising identification information of a user; an authorisation means (320) configured to perform an authorisation process for the semi-movable means on the basis of the received request message; a sending means (330) configured to send a response message to the client device (200, 420) on the basis of a result of the authorisation process.

According to a fourth aspect of the invention, there is provided a system (400) for controlling a semi-movable service means dedicated to a use in airport infrastructures, said system comprising a client device (200, 420) according to the second aspect described above and a server device (300, 430) according to the third aspect described above, wherein the client device is connected to the semi-movable means.

According to a fifth aspect of the invention, there is provided a computer program suitable for executing, when said program is run on a computer, all the steps according to the first aspect.

According to a sixth aspect of the invention, there is provided a medium for storing a computer program suitable for executing, when said program is run on a computer, all the steps according to the first aspect.

LIST OF FIGURES

DETAILED DESCRIPTION

Figure 2:
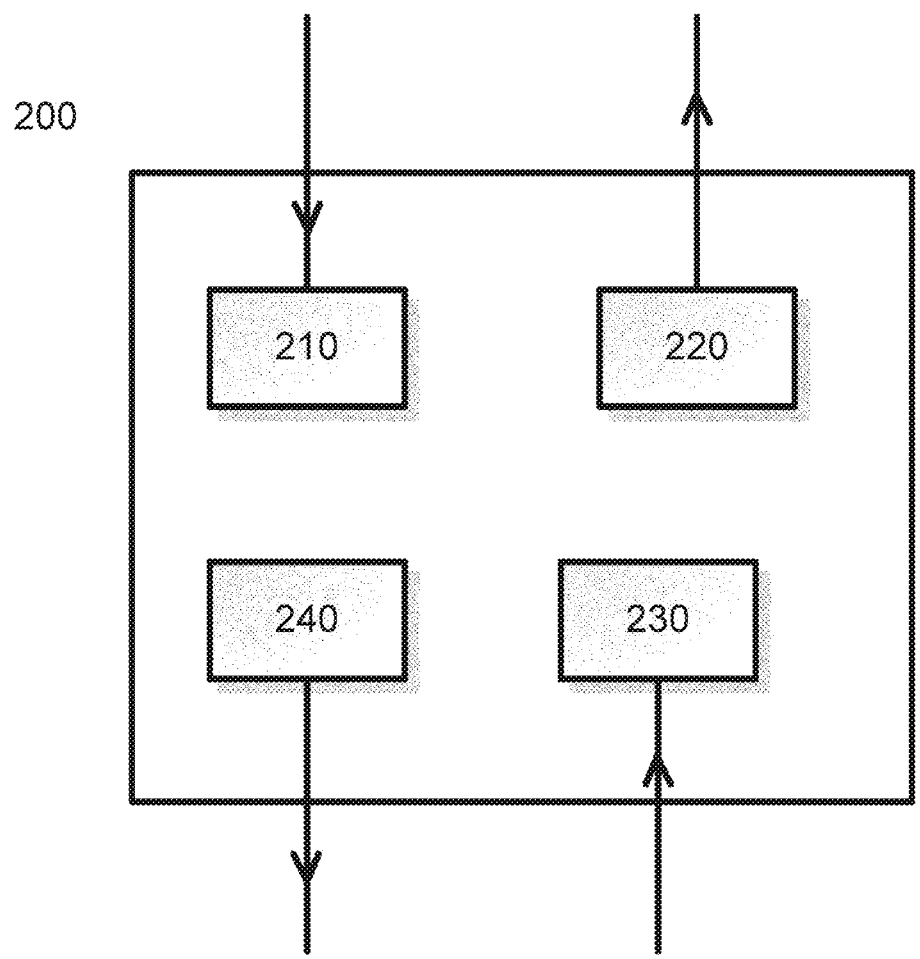
FIG. 2 is a block diagram of a client device according to one embodiment of the present invention.

In order to improve the control of the service means, it is conceivable, for example, to give every user a key whose use for specific means can be programmed, i.e. controlled, for example before being delivered to the user. In other words, a user authorised to use one or more service means is provided with a key that is enabled to open and/or start the means. However, in the event that a key is lost, there is no way to prevent that key from allowing use of the means for which it was enabled. Therefore, if a key is lost (or stolen), there may be a potential failure in the security system as regards the use of the service means.

It is also conceivable to provide several keys to several users, and configure the semi-movable means in such a way that certain users (one, several or all users) are authorised to perform at least certain operations with one or more semi-movable means. In the event that a key is lost, however, it will be necessary to reprogram all the means in order that the lost key is disabled in the various means, preferably in all the means. Even if the reprogramming operation is managed remotely rather than manually, it would nonetheless be cumbersome; moreover, contacting and reprogramming all the means would in any case require a non-negligible amount of time.

The inventors have thus recognised that a further improvement in the access to and control of service means can be obtained if the user is enabled to use the means via a server in response to a request message sent by the service means, and wherein the request message contains an identifier of the user who intends to use the means. The obtainment of the user identifier by the service means can therefore be seen as a trigger of the request for authorisation to control or use the means. Even though the request may have to be sent at each new use of the service means, it has been found that this solution leads to an improvement in the control of the service means also compared to the conceivable solutions described above. Control of the service means can be implemented in a system comprising said server and a client connected to the means ("client-server" architecture).

A first embodiment of the present invention will now be described with reference to FIG. 1, which illustrates a flow diagram relating to a method for controlling a semi-movable service means dedicated to a use in airport infrastructures. It may for example be dedicated to operations of loading/unloading of an aircraft, such as loading/unloading of cargo, loading/unloading of passengers, cargo conveyance, baggage conveyance, towing of trailers, etc. Furthermore, said method may be implemented to control a semi-movable service means dedicated to a use in infrastructures other than airports, such as railway or port infrastructures and/or for sorting goods, an infrastructure for the production or assembly of products, etc. In general, what is described here can be applied to any service means dedicated to use in any infrastructure (of which the ones listed are non-limiting examples), wherein infrastructure means a physical structure in which access and circulation are limited or restricted to certain users, and dedicated means that the service means is specifically intended and configured for use in that infrastructure.

Control means, for example, remote enabling/disabling of the means, e.g. opening/closing of doors of the means, and/or enabling/disabling of the engine or motor (of the starter motor of an internal combustion engine, and/or of the electric motor in the event of electric traction or hybrid means, etc.); thus enabling and/or disabling comprises in general an enabling or disabling (hereinafter also inhibition) of any use of the means, and preferably an enablement or inhibition of the starting of the engine or motor that allows the means to move (hereinafter also main engine or motor). In this regard, it is observed that each of the means discussed here may also comprise other motors configured to drive moving parts of the means, but not suitable for moving the means itself (for example, motors for driving conveyor belts, for driving mobile stairs, for positioning mobile stairs, etc.). Semi-movable means is understood as a mobile means that can be stopped, i.e. rendered stationary, in a stopping position of the means. Examples of such means are self-propelled belts, self-propelled stairs, transporters, cargo loaders, tractors, vehicle tow tractors, baggage trailer tow tractors, baggage trailers, de-icers, toilet service units, and water service units. Furthermore, said means can be configured so that the conveyance of cargo can take place in the stopping position of the means and/or while the means is moving. More in general, according to one example, a service means is represented by a means capable of providing a service such as moving people and/or objects when the means is in a stopping position. According to another example, a semi-movable means is a means that is capable of providing a main service characterising the function of the semi-movable means itself when the semi-movable means is in the stopping position. The main function includes the function of conveying people and/or objects. In other words, therefore, a semi-movable means comprises a means that is capable of conveying people and/or objects via activatable means, also when the means is in the stopping position (i.e. the means itself is not moving, but some of its parts are moving to enable people and/or objects to be moved or conveyed). One example of such a semi-movable means is represented by self-propelled stairs which perform the task of enabling passengers and/or authorised personnel (technicians, crew members etc.) to get on and off an aircraft, only after having been rendered stationary. Another example of such means is provided by conveyor belts disposed on a motorised means, in which the conveyor belt is activated when the motorised means is in a stopped condition. Such self-propelled conveyor belts can be configured to be coupled with a means of transport such as an aircraft, and to enable, for example, belt conveyance of baggage.

Said method is preferably implemented in a system (400) comprising a client device (200, 420) and a server device (300, 430). The client device and the server device can communicate with each other via a mobile network (of any type, such as, for example, WLAN, or a cellular network such as UMTS, LTE, LTE-A, etc.). Although it is less practical, communication may also take place via wires, if, for example, the semi-movable means does not need to be moved frequently or only moved small distances.

The client device can be included in the service means, preferably stably fixed thereto (or movable, but in such a way that it cannot be easily removed when the service means is not being used by anyone), and can be installed at the time of production of the service means or subsequently on means already in operation. Furthermore, the client device can communicate with other parts of the service means via a wired or wireless connection.

In general, the client device is configured to receive user identification information from a user device, and transmit it to the server device in a request message. The client device can optionally comprise one or more of the following modules: (1) one or more telemetric devices provided with an Internet connection that make it possible to: (a) communicate with the server device, (b) obtain information from external devices (such as identification systems or other vehicular accessories), (c) obtain information from the on-board network of the means, (d) activate commands to enable/disable the means, (2) a badge reader for recognition of the user, for example the driver, or, alternatively or in addition to the badge reader, (3) an iButton reader for recognition of the user.

Server device may mean an information system over one or more servers or a cloud (i.e. a system in which the server functions are distributed over the cloud). In general, the server device is configured to receive a request message from the client device, and to perform an authorisation process on the basis of that message. The server device may optionally comprise: (1) a module for measuring use (e.g. time of use, cost, etc.), (2) a module for verifying the identity of the user, for example the driver, and the authorisation thereof to use the means, (3) a module for calculating the SLA (Service Level Agreement) vis-à-vis an airline company, (4) a module for sending commands to remote telemetric devices, and/or (5) a module for computing specific predetermined reports (for example regarding the time of use, position, etc.). With reference to the module for verifying identity and authorisation (see (2) above), it is observed that verifying identity is distinct from authorising use of the means. In particular, even if the identity of the user is positively confirmed (for example, the user identifier corresponds to the one memorised in an authentication server), use of the means can nonetheless be explicitly inhibited by means of a message suitable for that purpose, for example by inhibiting the start-up of the main engine or motor of the means or completely inhibiting the start-up of any of the components of the means. In other words, an explicit inhibition for a correctly identified user is preferably provided for.

The server device can optionally provide a plurality of functions, such as, for example, the ones mentioned below for non-limiting illustrative purposes.
1. Remote Authorization/Authentication on the basis of one or more among:
a. Authentication/Authorisation on the basis of the user identifier; b. Authentication/Authorisation on the basis of the hour, for example the time at which the request message is sent or the moment in which the user is identified by the client via the user device;
c. Authentication/Authorisation on the basis of the schedule of inbound aircraft;
d. Authentication/Authorisation on the basis of an operator that operates in the infrastructure with which the service means is associated.

For identification/authorisation, reference is made to their distinction as illustrated above.
2. Vehicle Status Monitor, comprising one or more of the following optional functions:
a. Accident detection
b. Check on the return of the vehicle according to agreed policies, such as, for example, fuel level, accessories and correct status of the semi-movable means (e.g. baggage conveyor stationary), etc.
c. Monitoring of use according to safety policy (e.g. wearing of safety belts)
d. Monitoring of vehicle battery (primary/secondary)
e. Monitoring of trailer status (battery/operating status).
3. Activities Certification, comprising one or more of the following optional certification or verification functions:
a. Compliance with the policies of the airport (or more in general of the place in which the vehicles operate) based on speed, route, cornering, driving style, areas allowed, hours of use, etc.
b. Compliance with the SLAs requested by airline companies (crossing the data from the schedule of inbound aircraft)
c. Management of fines.
4. Maintenance Certification, comprising one or more of the following optional certification or verification functions:
a. Routine maintenance notifications
 i. Operations plan of the manufacturer
 ii. Overhaul
 iii. Servicing
b. Extraordinary maintenance notifications
 i. Engine or motor malfunctions, ABS system, ESP system, braking system, body computer, airbags
 ii. Tyre malfunctions
 iii. Oil, water, brake fluid indicator faults
c. Reports
 i. Maintenance certification
 ii. Maintenance details (activities performed and spare parts)

Going back to the method of the present embodiment, in step S110, identification information of a user is obtained at the client device from a user device. The user device is preferably external to and/or distinct from the service means, so that the user can carry it with him irrespective of whether he is using the service means. The identification information can for example comprise data related to the user. For example, the identification information comprises an identifier (preferably unique) of the user or of a group of users, a parameter that distinguishes the user (for example biomedical parameters such as fingerprints, etc.), a description of a group of users to which the user belongs, etc. The user device (or, hereinafter, also external device) can be for example an identification badge, an iButton, a smartphone, a key or any object containing a microchip, etc. Said external device can contain data, that is, it can include a memory containing data, which can be transmitted to the client device. The external device is capable of transmitting the identification information (and optionally other data as well) to the client device; the transmission can take place, for example, via a wireless network, by contact (for example, a key with electrical contacts), by means of RFID techniques, etc.

In step S120, a request message is sent from the client device to the server device on the basis of the obtained information (physical sending of the message can be performed by the client device, or, for example, via a communication unit installed in the service means). The request message can comprise data related to the identification information, i.e. the identification information obtained from the user device. Such information can be processed by the client device (for example encrypted, or subjected to hashing or transformation to avoid sending explicitly the same information of the user) and then included in the request message. Said message can further comprise data related to the means it is desired to control, for example an identifier of the service means, and/or a description of the model of the service means, etc. The request message is a message whereby the server device is requested for authorisation to enable the service means to be used and/or controlled by the user.

In step S130, an authorisation process for the semi-movable means is performed at the server device on the basis of the received request message. The authorisation process can comprise a processing of control data included in a memory of (or accessible from) the server device and the data included in the received request message. Said processing can comprise a comparison of the data, or information, contained in the request message with the control data stored in the memory of the server device.

The control data can be data that link identification information of one or more users (or groups of users, etc.) and data relating to one or more means (or groups of means, and/or type of means, etc.) which can be controlled, or enabled/disabled, via the server. For example, the control data associate an identifier of the service means with identification information of one or more users to whom use (limited or unlimited) of the means is allowed. Any appropriate data structure can be used for said control data. The control data can refer to means belonging to one or more firms operating in the infrastructure, for example in the airport infrastructure. The memory of the server device can further contain data relating to an authorisation of the plurality of users to use the plurality of means. The memory can further contain data regarding the infrastructure, for example the airport infrastructure, such as, for example, data related to the schedule of inbound or outbound aircraft, etc. Based on what has been said, therefore, the control data indicate an authorisation or inhibition of use of the means by a given user; they will thus also be called authorisation information that associates a user (e.g. a user identifier) with an authorisation or inhibition of the use of the means. Preferably, the authorisation or inhibition refers to start-up of the main engine or motor, but it may also be intended to authorise or inhibit use of any part or functions of the means.

The data contained in the memory of the server device can be updated, deleted, added, and/or changed by an administrator of the server device. For example, it can also be automatically updated by the server device on the basis of a predetermined period of time. For example, the server device can contain information enabling a specific user, which authorises the use of a means for a predetermined period of time. When said period of time ends, the server device can update the authorisation information so that the user concerned is no longer enabled to use the means, for example the service means stops working, or the server device maintains (or sends to another server) a log file with the control and/or usage data of the means.

The authorisation process can further and optionally be performed based on the hour and the schedule of the inbound aircraft, and/or the user, and/or group to which the user belongs (for example, a certain operator/firm).

In step S140, a response message is sent from the server device to the client device on the basis of a result of the authorisation process. For example, the response message includes information that indicates an enablement to unlock and use the means; optionally, the response can also indicate parameters related to the authorised use, such as, for example, the duration of use, whether there are any restrictions (e.g. only some functions of the means may be performed by the operator), etc. Based on what was said above, if an inhibition for a user (even if correctly identified) is provided for, the response message can include an indication of inhibition for that user and that means.

In step S150, a control of the semi-movable means is performed at the client device on the basis of the received response message. For example, if the server device recognises that the user making the request is a user enabled to use the means, the response message will contain data that permit the enablement of the means (e.g. a signal that permits the opening of the means and/or start-up of the engine or motor and/or enabling/disabling of the ignition/start-up of the engine or motor). The client device, on receiving said message, will enable the control of the service means by the user, for example by enabling or inhibiting start-up of the main engine or motor. Therefore, use can be expressly denied (by means of the request to inhibit use) also to a correctly identified user.

The above-described method allows the service means to be controlled remotely and thus makes possible a real-time control of the means. What is more, it is possible to control the use of the service means dynamically, something that is not achievable or thinkable with other known or conceivable solutions. It further allows the safety in the use of the means to be improved. For example, if an external device containing information about an enabled user is lost, it will be possible to immediately disable the authorisation of that user directly from the server. In addition, said method makes it possible to update, in an efficient manner, a list of users authorised (or not authorised) to use the service means (and, optionally, to what extent such use is allowed).

It is noted that the obtainment of identification information (step S110) can be considered as a trigger for step S120, in which the request message is sent, or in other words the obtainment of identification information represents a prompt to send the request message as soon as possible. The request message, in turn, can be considered as a trigger or prompt to perform the authorisation process (S130) with the consequent sending of the response message (S140). In other words, the identification of the user represents a trigger to perform (or a prompt to perform as soon as possible) the authorisation procedure; thanks to this causality between local identification at the client and remote authorisation from the server, it is possible to obtain a system of improved control of the service means.

It is noted that in an optional variant the above-described process (and the variants thereof further below) can be repeated over time (for example at regular and/or random, and/or scheduled intervals of time; and/or in concomitance with certain events, also predetermined ones; and/or according to the position of the means, etc.) in order to verify, for example, that the user operating the means is the same as the one already authorised by a previous request to the server. The repetition of the process can be triggered, for example, by the client device, duly programmed, or by another device that sends a command to this effect to the client or a command to the user device to communicate the identification information. In another variant (optionally also in addition to the previous one), the server can send a prompt message, in response to which the client obtains (or seeks to obtain) the user identification information from the external user device, so that the client can once again request or request confirmation of authorisation to use the means from the server.

In an optional variant, the client device can additionally enable the user (to use the service means at least temporarily) in any case, if the identification information has been received from the external user device, even if the client device has not received the response message from the server device or the client device is not capable of sending the request message to the server. In this temporary mode, it is possible to prevent the operation of the means from being made completely dependent on the availability of the communication channel between the client and server. The temporary mode can be set in such a way as to be limited in time (for example, until a certain timer goes off), or allowed only for a certain class of means or users. Furthermore, the client device can send the request message when sending is once again possible (for example, as soon as the communication channel becomes operational again, or when other obstacles such as malfunctions disappear); in such a case, the request message can optionally include an indication that the use was temporary or temporarily non-authorised. The server will thus be able to respond, and the client will consequently be able to terminate the authorisation for use or allow it to continue depending on the response. In a similar manner, if the temporary mode was activated due to the lack of a response from the server, the client can disable or continue to enable use when the response finally arrives from the server. The user identification information can be memorised by the client and by the server during and after (in this case, also exchanged between them) the temporary operating mode.

In an optional variant of the first embodiment, the authorisation process comprises an authentication process in which the authenticity of the identification information is verified. For example, it is verified that the identification information is authentic (for example using encryption techniques, etc).

According to a further optional variant of the present embodiment, in a step S160 (not illustrated in the figures), information related to the semi-movable means is obtained in the client device. The information related to the semi-movable means can comprise, for example, parameters of the means, including, for example, vital parameters of the means. Said parameters can be obtained from the on-board network of the means or external accessories. Said information can further comprise data related to the use of the means by the user, for example, for how long the means has been used by a specific user since its use was enabled.

Furthermore, in a step S170 (not illustrated in the figures), said information related to the semi-movable means is sent to the server device in the client device.

According to a further optional variant of the present embodiment, in a step S180 (not illustrated in the figures), said received information related to the semi-movable means is processed in the server device. For example, the server can make a count of the time and/or costs of use of the means, calculate the SLA (Service Level Agreement) vis-à-vis the airline company, etc. Furthermore, the server has at its disposal the identification information of the user and information related to the service means, so that the server will be able to correlate them.

Said method thus enables monitoring of the status of the service means. For example, it makes it possible to detect accidents, check the return of the vehicle according to the agreed policies, such as the fuel level, accessories and correct status of the semi-movable means (e.g. baggage conveyor stationary), preferably associating such events with the identification information of the user. It is further possible to monitor use according to safety policy (e.g. wearing of safety belts), monitor the vehicle battery (primary/secondary) and trailer status (battery/operating status), etc.

In addition, it is possible to monitor (preferably in relation to the authorised user, or in relation to the user identification information) compliance with the policies of the airport (or more in general of the place in which the vehicles operate) based on speed, route, cornering, driving style, areas allowed, times of use, compliance with the SLAs requested by airline companies (crossing the data from the schedule of inbound aircraft) and the management of fines.

According to another variant, in a step S190 (not illustrated in the figures), a command message is sent from the server device to the client device on the basis of the processing of said information related to the semi-movable means. In other words, the server device can send commands to the client device or to a plurality of client devices, or remote telemetric devices. The command message can comprise notifications and/or alerts enabling the administrator of the service to correctly provide the service, i.e. said command messages relate to maintenance, refueling and/or status of the accessories. Said command messages can be sent from the server to the client on the basis of the processing of said received information related to the semi-movable means.

The method thus enables the sending of messages related to the maintenance of the service means, such as routine maintenance notifications (operations plans of the manufacturer, overhauls, servicing), extraordinary maintenance notifications (engine or motor malfunctions, ABS system, ESP system, braking system, body computer, airbags, tyre malfunctions, oil, water, brake fluid indicator faults), reports (maintenance certification, maintenance details (activities performed and spare parts)).

It is further noted that the solution increases the efficiency of the vehicles, i.e. it decreases idle time (the time when the means is not operated), and improves the control of the vehicles operating in the infrastructure. The solution further makes it possible to provide, automatically, reports for the airline company which enable monitoring of the SLA (it is noted that this activity is presently carried out manually) and certify correct vehicle maintenance, so that the responsible airport authority may, if necessary, inhibit the use of non-conforming vehicles.

Optionally, in the method according to the present embodiment, step S130, in which the authorisation process is performed, comprises enabling or inhibiting use of the means by the user on the basis of authorisation information indicating an association between said user and an enablement or inhibition of the use of said means. In other words, during the authorisation process, a correctly identified user can be provided with an explicit authorisation or inhibition in relation to use of the means.

Optionally, in the method according to the present embodiment, wherein the semi-movable service means comprises an engine or motor suitable for enabling the movement thereof, step S130 of performing (S130) an authorisation process comprises performing the authorisation process for the semi-movable means on the basis of the received request message and authorisation information. As may also be inferred from what was described above, the authorisation information indicates an association between an identifier of the user and an authorisation or inhibition for the user to start the engine or motor of the semi-movable means. Preferably, various semi-movable means are associated with a user, and for each of those means an authorisation or inhibition is provided for that user. Preferably, what was said above is applied to a plurality of users, each associated with a plurality of means.

Thanks to the explicit indication of authorisation and inhibition, it is possible to improve the factor of use of the vehicles, since it is possible to allocate, dynamically and in real time, the use of the means to personnel, even when the users are all authenticated and have in general access to the facilities typically restricted to authorised persons only. Furthermore, thanks to the use combined with the server, it is possible to achieve this improvement in a flexible manner.

Figure 4:
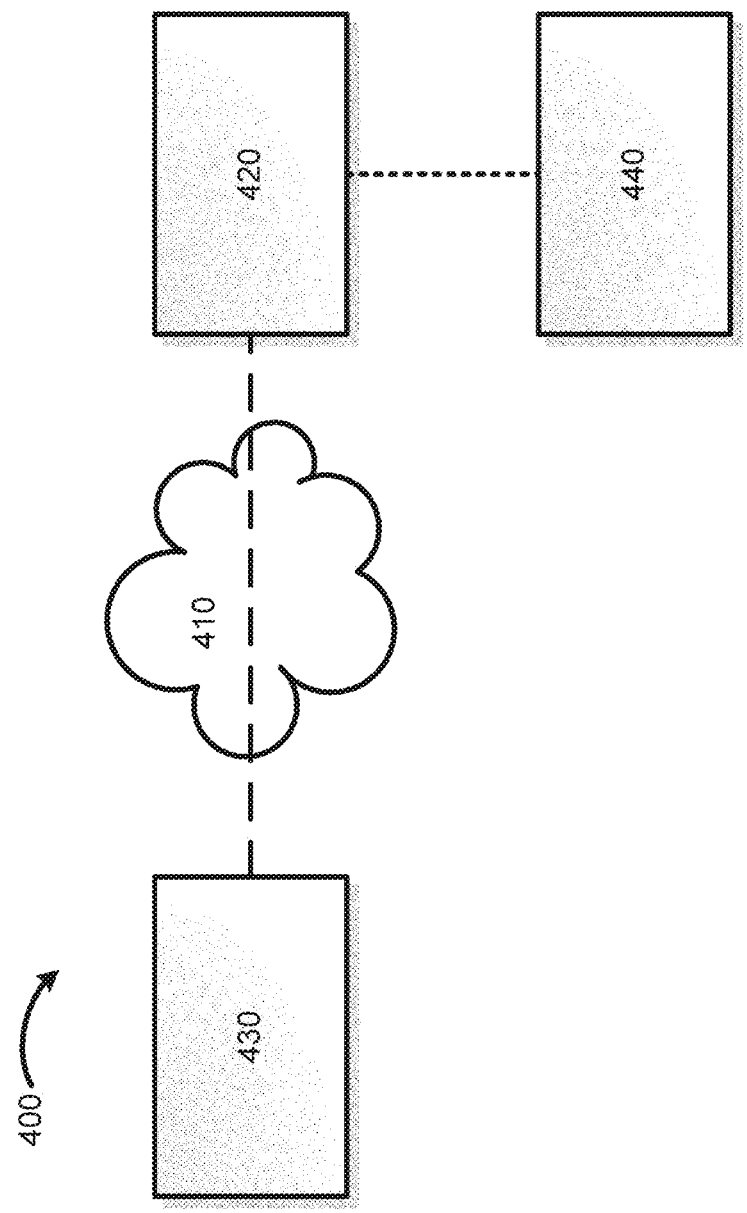
FIG. 4 is a block diagram of a system according to one embodiment of the present invention.

A second embodiment will now be described with reference to FIG. 2, noting that the above discussion also applies hereinafter. FIG. 2 illustrates a client device 200 (or also 420 in FIG. 4 illustrating the system) for controlling a semi-movable service means dedicated to a use in infrastructures (for example airport infrastructures) in a system 400 comprising said client device and a server device 300, 430. Said client device can further be configured to control a semi-movable service means dedicated to a use in infrastructures such as railway or port infrastructures and/or for the sorting of goods.

Said client device is connected to the semi-movable means and comprises an obtaining means 210, a sending means 220, a receiving means 230 and a control means 240.

The obtaining means 210 (or obtaining processing units) is configured to obtain identification information of a user from a user device (or external device, or external user device). The sending means 220 (or transmitter) is configured to send a request message to the server device 300 (or also 430 in FIG. 4) on the basis of the obtained information. The receiving means 230 (or receiver) is configured to receive a response message from the server device 300, 430. The control means 240 (or controller) is configured to perform a control of the semi-movable means on the basis of the received response message.

In one example of this embodiment, there can be envisaged the installation of on-board hardware powered by the vehicle battery and connected to the signal of the control panel so as to detect the moment when the control panel was switched on/off; a link to the starter motor (via a relay) in order to inhibit it in the event of lack of authorisation; an iButton reader or RFID reader for user recognition; a black box provided with a three-axis accelerometer for detecting any impacts and a GPS and GSM/GPRS module for the transmission of position data; on the client the authorisation request logic for unlocking the means (or at least some of its functions) which enables it to be started upon authorisation of the server or automatically if there is no connection to the server (unauthorised activation, or operation in the temporary mode as illustrated above). This is in order not to constrain the use of the service means to the availability of a GSM/GPRS signal. In the event of unauthorised activation, notification is in any case given to the server when the connection is restored, in order to identify any unauthorised uses.

Optionally, in the client device according to this embodiment, the response message comprises an indication of authorisation or inhibition of the use of said means, wherein said response message is obtained on the basis of authorisation information indicating an association between said user and an enablement or inhibition of the use of said means. Therefore, even when the user has been correctly authenticated, it is possible to provide an explicit authorisation or inhibition of the use of the means. Preferably, an indication is provided as to whether a start-up of the main engine or motor, or the components/parts of the means, is authorised or inhibited.

Figure 3:
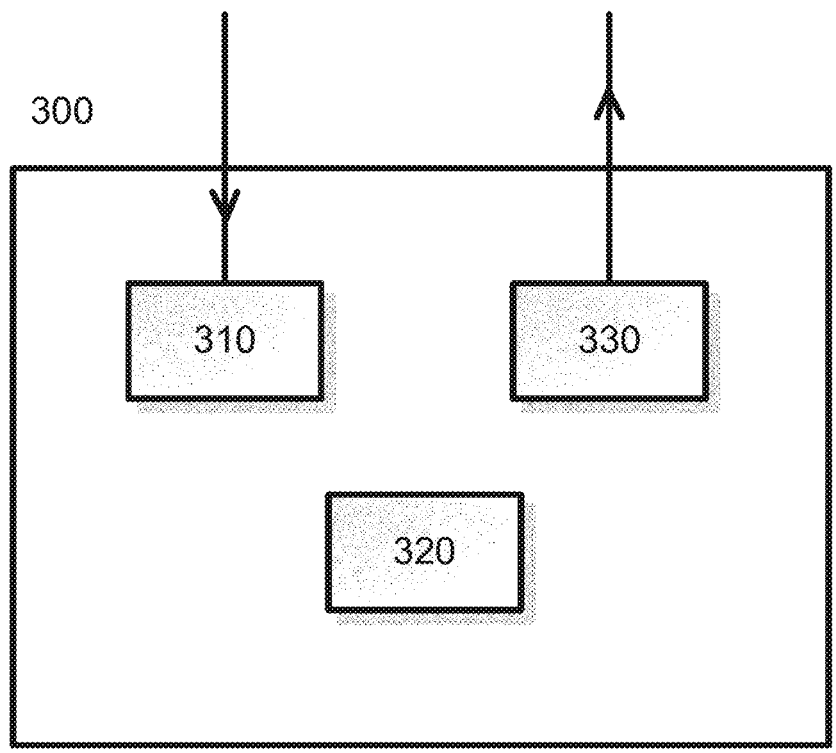
FIG. 3 is a block diagram of a server device according to one embodiment of the present invention.

A third embodiment will now be illustrated with reference to FIG. 3, which illustrates a server device 300 (430 in FIG. 4) for controlling a semi-movable service means dedicated to a use in airport infrastructures in a system 400, said server device comprising a client device 200, 420. Said server device can be further configured to control a semi-movable service means dedicated to a use in infrastructures such as railway or port infrastructures and/or for the sorting of goods.

The client device is comprised in the service semi-movable means. Said server device comprises: a receiving means 310 (or receiver), an authorisation means 320 (or processor) and a sending means 330 (or transmitter).

The receiving means 310 is configured to receive a request message from the client device 200, 420. The authorisation means 320 is configured to perform an authorisation process for the semi-movable means on the basis of the received request message. The sending means 330 is configured to send a response message to the client device 200, 420 on the basis of a result of the authorisation process.

Optionally, in the server device according to this embodiment, wherein the semi-movable service means comprises a motor suitable for enabling the movement of said means, the server device comprises a memorisation means configured to memorise, preferably for each user of a plurality of users, authorisation information indicating an association between a user identifier and an authorisation or inhibition of the start-up of the engine or motor for at least one semi-movable means comprised in a plurality of semi-movable means. Furthermore, in this example, said authorisation means (320) is configured to perform an authorisation process for the semi-movable means on the basis of the received request message and said authorisation information.

Optionally, the server device according to this embodiment comprises a memorisation means configured to memorise, preferably for each user of a plurality of users, authorisation information indicating an association between the user and an enablement or inhibition of the use of at least one semi-movable means comprised in a plurality of semi-movable means, wherein the authorisation means (320) is configured to perform the authorisation process on the basis of the received request message and the authorisation information.

According to an illustrative example of said embodiment, the server device can comprise hardware programmed to execute a:

Remote system of authorisation of the use of the service means, composed of:
1. Management of user personal data with the association of iButtons or badges
2. For all users and all service means, a system for defining rules for the authorisation of individual users to drive individual means (according to an example illustrated above, which envisages an inhibition or authorisation of the use of a plurality of vehicles by a plurality of users).
3. Algorithm for user authentication and authorisation based on the set service means.
4. Communication module for sending commands to enable start-up of the means
   Reports in the period on the activities of the various means with a user attribution and an "on" status depending on the real movement (also to identify stop times).

FIG. 4 shows a system for controlling a semi-movable service means dedicated to a use in airport infrastructures according to another embodiment, wherein the system comprises a client device 200, 420 as described above and a server device 300, 430 as described above, wherein the client device is connected to the semi-movable means. The client device 200, 420 and the server device 300, 430 can be interconnected by any mobile network 410. The client device 200, 420 can communicate with a user device 440, or external user device.

Figure 5:
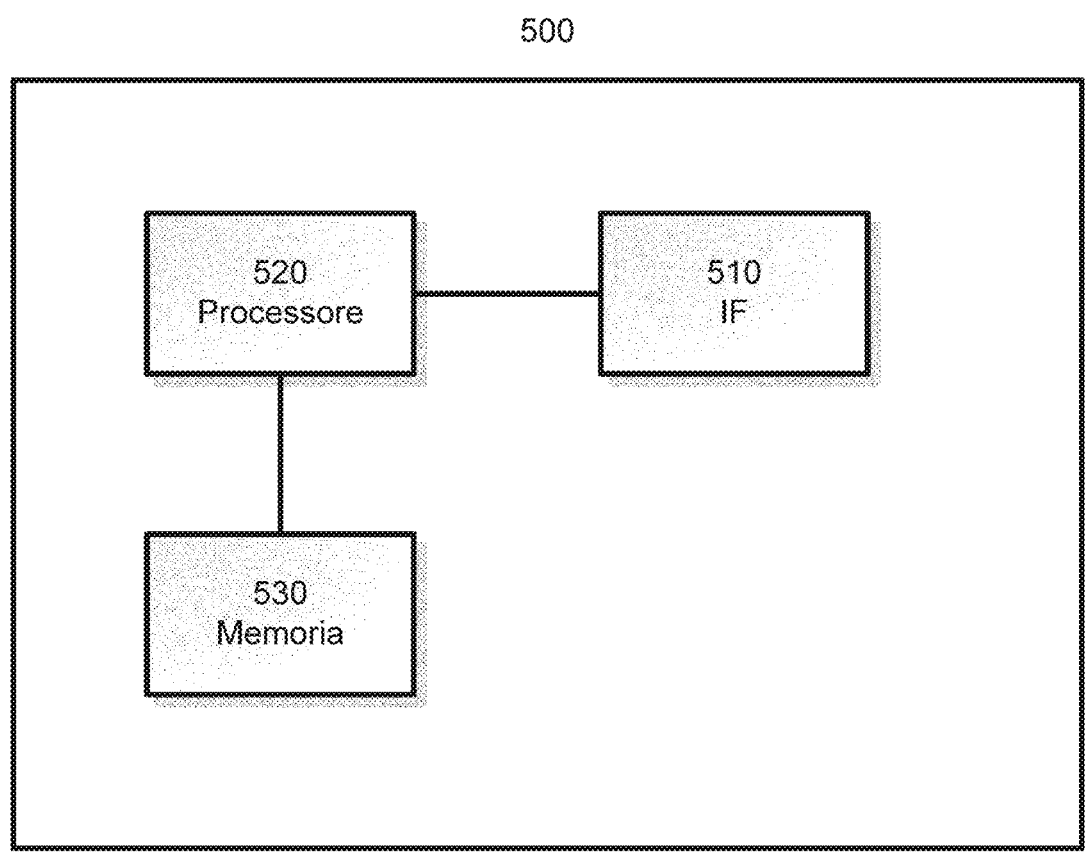
FIG. 5 is a block diagram of a computer capable of implementing the present invention according to one embodiment.
Figure 6:
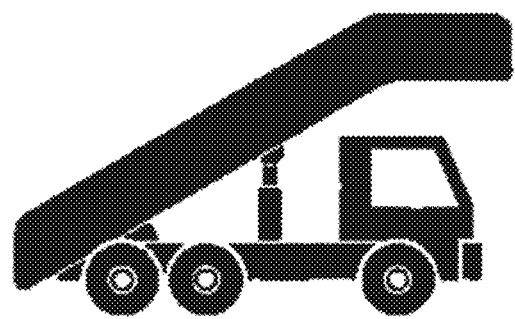
FIG. 6 shows an example of some service means known in the art.
Figure 6:
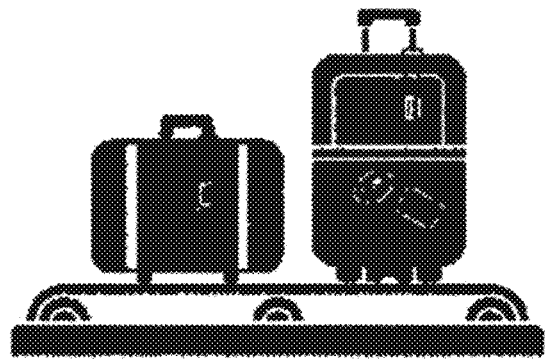

In another embodiment, there is provided a computer program suitable for executing, when said program is run on a computer, any step or combination of steps of the method and of the variants thereof as described with reference to the first embodiment. FIG. 5 illustrates a block diagram exemplifying a computer 500 capable of running the aforesaid program. In particular, the computer 500 comprises a memory 530 for memorising the instructions of the program and/or the data necessary for its execution, a processor 520 for the execution of the instructions and an input/output interface 510.

According to a further embodiment, there is provided a medium for storing a computer program suitable for executing, when said program is run on a computer, one or a combination of the steps according to the method described in the first embodiment. Examples of a medium are a static and/or dynamic memory, a hard disk or any other medium such as a CD or DVD. A signal is also an example of such a medium, since the method can in fact be performed in a distributed manner, in which the various entities execute different parts thereof by communicating through suitable signals.

What was described above with reference to the authorisation information will now be illustrated with an example: for each user of a set of users, the server maintains information associating the user and semi-movable means (for example related to an association between a user and at least one semi-movable means of a plurality of semi-movable means), wherein such association information indicates, for each of said users and each of the semi-movable means associated with the user, an association between a user identifier and an authorisation or an inhibition of the start-up of the main engine or motor. By way of explanation in a table (noting that other forms of representation are possible):

| User ID | Semi-movable means ID | Authorisation (A)/Inhibition (I) |
|---|---|---|
| X | Stairs 1 | A |
| X | Stairs 2 | I |
| X | Stairs 3 | A |
| X | Belt 1 | A |
| X | Belt 2 | A |
| X | Belt 3 | I |
| ... | | |
| Y | Stairs 1 | A |
| Y | Stairs 2 | A |
| Y | Stairs 3 | I |
| Y | Stairs 4 | I |
| Y | Belt 1 | I |
| Y | Belt 2 | A |
| ... | | |
| Z | Stairs 1 | I |
| Z | Belt 1 | A |
| ... | | |

Considered in the example is the case where starting the main engine or motor is authorised or inhibited, although the authorisation or inhibition may refer in general to the use of the means; in other words, the authorisation or inhibition may refer to the operation of the means as a whole, or, in other words, the authorisation or inhibition of the activation of any part of the means. In still other words, a correctly authenticated user can be prevented from making any use of the means, or authorised to make unlimited or limited use thereof according to further conditions specified for that user.

The server can perform the authorisation process (S130) for the semi-movable means on the basis of the request message received from the client device and on the basis of the authorisation information (indicating, for example, the association). For example, the server can compare an identifier of the user (identification information obtained from the user device) included in the request message and an identifier of the semi-movable means (data related to the means that it is desired to control) also included in the request message with the authorisation information (indicating for example the association included in the server). The server can send (S140) the response message to the client device on the basis of the result of the comparison, indicating, for example, whether or not the user concerned is authorised to use the semi-movable means. Finally, the client device can perform (S150) a process of enabling or inhibiting use of the semi-movable means on the basis of the received response message.

The enablement of use can include, for example, opening the doors or starting the engine or motor of the semi-movable means.

Naturally, the above description of embodiments and examples applying the principles recognized by the inventors is provided solely by way of illustration of these principles and should therefore not be regarded as a limitation of the scope of the invention claimed herein. In particular, what has been described above for the method also applies for the respective devices, computer program, etc., and vice versa. Furthermore, what has been described above with reference to devices should be understood as being implementable by means of any combination of hardware, software and firmware, either concentrated (in a single apparatus) or distributed (for example, over a plurality of interconnected apparatus). Therefore, terms such as obtaining means, control means, receiving means, authorisation means and sending means can be replaced, respectively, by obtaining units (or input units), control unit (or controller), receiving unit (or receiver), authorisation unit (or processor for determining authorisation) and sending unit (or transmitter). Naturally, the above description of embodiments and examples applying the principles recognized by the inventors is provided solely by way of illustration of these principles and should therefore not be regarded as a limitation of the scope of the invention claimed herein.

The invention claimed is:

1. A method for controlling a plurality of semi-movable service apparatuses used at an airport, the method comprising:
    obtaining, at a client device, identification information of a user from the user or from a user device, the client device being associated with one of the semi-movable service apparatuses;
    sending a request message from the client device to a server device based on the identification information, the request message requesting the server device to perform an identification process to verify an identity of the user, and, if verification of the user is confirmed, an authorization process to determine whether the one of the semi-movable service apparatuses is among a subset of the semi-movable service apparatuses the user is authorized to use,
    wherein, if the authorization process determines that the user is authorized to use the one of the semi-movable service apparatuses, the authorization process further determines whether the user is authorized to use all functions of the one of the semi-movable service apparatuses or only a subset of the functions of the one of the semi-movable service apparatuses;
    receiving, at the client device, a response message from the server device, the received response message relating to a result of the authorization process and indicating an inhibition of use of the one of the semi-movable service apparatuses by the user or an enablement of use of all the functions of the one of the semi-movable service apparatuses or only the subset of the functions of the one of the semi-movable service apparatuses; and performing, at the client device, a control of the one of the semi-movable service apparatuses based on the received response message.

2. The method of claim 1, further comprising:
obtaining, at the client device, information relating to the one of the semi-movable service apparatuses; and
sending the information relating to the one of the semi-movable service apparatuses from the client device to the server device.

3. The method of claim 2, wherein the information relating to the one of the semi-movable service apparatuses is sent to the server device for processing by the server device.

4. The method of claim 3, further comprising:
receiving, at the client device, a command message sent from the server device, the command message relating to a result of the processing of the information relating to the one of the semi-movable service apparatuses by the server device.

5. The method according to claim 1, wherein:
the one of the semi-movable service apparatuses comprises an engine or motor suitable for enabling movement of the one of the semi-movable service apparatuses, and
the authorization process is performed by the server device based on the received request message and authorization information, the authorization information indicating an association between an identifier of the user and an authorization or inhibition for the user to start the engine or motor for at least the one of the semi-movable service apparatuses.

6. A client device equipped in a semi-movable service apparatus of a plurality of semi-movable service apparatuses used at an airport, to control the semi-movable service apparatus, the client device comprising:
an information reader configured to obtain identification information of a user from the user or from a user device;
a transmitter configured to send a request message to a server device based on the identification information, the request message requesting the server device to perform an identification process to verify an identity of the user, and, if verification of the user is confirmed, an authorization process to determine whether the semi-movable service apparatus is among a subset of the semi-movable service apparatuses the user is authorized to use,
wherein, if the authorization process determines that the user is authorized to use the one of the semi-movable service apparatuses, the authorization process further determines whether the user is authorized to use all functions of the one of the semi-movable service apparatuses or only a subset of the functions of the one of the semi-movable service apparatuses;
a receiver configured to receive a response message from the server device, wherein the received response message indicates an inhibition of use of the semi-movable service apparatus by the user or an enablement of use of all the functions of the semi-movable service apparatuses or only the subset of the functions of the one of the semi-movable service apparatuses; and
a controller configured to perform a control of the semi-movable service apparatus based on the received response message.

7. A server device for controlling a plurality of semi-movable service apparatuses used at an airport, the server device comprising:
a receiver configured to receive a request message from a client device, the request message including identification information of a user obtained by the client device from the user or from a user device, and the request message requesting an identification process to verify an identity of the user, and, if verification of the user is confirmed, an authorization process to be performed to determine whether the user is authorized to use one of the semi-movable service apparatuses, the one of the semi-movable service apparatuses being associated with the client device,
wherein, if the authorization process determines that the user is authorized to use the one of the semi-movable service apparatuses, the authorization process further determines whether the user is authorized to use all functions of the one of the semi-movable service apparatuses or only a subset of the functions of the one of the semi-movable service apparatuses;
a memory configured to store identification data for a plurality of users and authorization information for each of the users, wherein for each of the users the authorization information indicates a subset of the semi-movable apparatuses the user is authorized to use,
a processor configured to perform the identification process and the authorization process for the user for the one of the semi-movable service apparatuses based on the received request message; and
a transmitter configured to send a response message to the client device based on a result of the authorization process, wherein the response message indicates an inhibition of use of the one of the semi-movable service apparatuses by the user or an enablement of use of all the functions of the one of the semi-movable service apparatuses or only the subset of the functions of the one of the semi-movable service apparatuses.

8. The server device according to claim 7, wherein:
the one of the semi-movable service apparatuses comprises an engine or motor suitable for enabling movement of the one of the semi-movable service apparatuses,
the authorization information stored in the memory indicates an association between a user identifier and an authorization or inhibition of starting the engine or motor for at least the one of the semi-movable service apparatuses, and
the processor is configured to perform the authorization process for the one of the semi-movable apparatuses based on the received request message and the authorization information.

9. The server device according to claim 7, wherein
when the subset is empty, the user is inhibited from using any of the semi-movable apparatuses, and
for each of the users, the authorization information stored in the memory indicates one or more functions of each semi-movable apparatus of the subset the user is authorized to use.

10. A system for controlling a plurality of semi-movable service apparatuses used at an airport, the system comprising:

a client device equipped in one of the semi-movable service apparatuses to control the one of the semi-movable service apparatuses; and a server device for enabling control of the one of the semi-movable service apparatuses, wherein the client device comprises:
an information reader configured to obtain identification information of a user from the user or from a user device, a client transmitter configured to send a request message to the server device based on the identification information, the request message requesting the server device to perform an identification process to verify an identity of a user, and, if verification of the user is confirmed, an authorization process to determine whether the one of the semi-movable service apparatuses is among a subset of the semi-movable service apparatuses the user is authorized to use, a client receiver configured to receive a response message from the server device, the received response message from the server device indicating an inhibition of use of the one of the semi-movable service apparatuses by the user or an enablement of use of one or more functions of the one of the semi-movable service apparatuses by the user, and a client controller configured to perform a control of the semi-movable service apparatus based on the received response message from the server device, and wherein the server device comprises:
a server receiver configured to receive the request message from the client device, the request message including the identification information of the user obtained by the client device, a memory configured to store identification data for a plurality of users and authorization information for each of the users, wherein for each of the users the authorization information indicates a subset of the semi-movable apparatuses the user is authorized to use, a processor configured to perform the identification process and the authorization process for the user for the one of the semi-movable service apparatuses based on the received request message, wherein, if the authorization process determines that the user is authorized to use the one of the semi-movable service apparatuses, the authorization process further determines whether the user is authorized to use all functions of the one of the semi-movable service apparatuses or only a subset of the functions of the one of the semi-movable service apparatuses, and a server transmitter configured to send a response message to the client device based on a result of the authorization process, the response message sent to the client device indicating an inhibition of use of the one of the semi-movable service apparatuses by the user or an enablement of use of all the functions of the one of the semi-movable service apparatuses or only the subset of the functions of the one of the semi-movable service apparatuses.

11. A non-transitory computer-readable storage medium storing a computer program that, when executed by a computer, causes the computer to perform a method for controlling a plurality of semi-movable service apparatuses used at an airport, wherein the method comprises:

obtaining, at a client device associated with one of the semi-movable service apparatuses, identification information of a user from the user or from a user device;

sending a request message from the client device to a server device based on the identification information, the request message requesting the server device to perform an identification process to verify an identity of the user, and, if verification of the user is confirmed, an authorization process to determine whether the one of the semi-movable service apparatuses is among a subset of the semi-movable service apparatuses the user is authorized to use, wherein, if the authorization process determines that the user is authorized to use the one of the semi-movable service apparatuses, the authorization process further determines whether the user is authorized to use all functions of the one of the semi-movable service apparatuses or only a subset of the functions of the one of the semi-movable service apparatuses;

receiving, at the client device, a response message from the server device, the received response message relating to a result of the authorization process and indicating an inhibition of use of the one of the semi-movable service apparatuses by the user or an enablement of use of all the functions of the one of the semi-movable service apparatuses or only the subset of the functions of the one of the semi-movable service apparatuses; and performing, at the client device, a control of the one of the semi-movable service apparatuses based on the received response message.

12. The client device according to claim 6, wherein when the subset is empty, the user is inhibited from using any of the semi-movable apparatuses, and
the received response message indicates whether the user is authorized to use some or all functions of the semi-movable apparatus.

13. The system according to claim 10, wherein when the subset is empty, the user is inhibited from using any of the semi-movable apparatuses, and
the response message sent from the from the server device to the client device indicates whether the user is authorized to use some or all functions of the one of the semi-movable apparatuses.

14. The client device according to claim 6, wherein in the identification process, the identification information is used to verify an identity of the user, and
if the identity of the user is verified, the authorization process is performed.

15. The server device according to claim 7, wherein in the identification process, the identification information is used to verify an identity of the user, and
if the identity of the user is verified, the authorization process is performed.

16. The system according to claim 10, wherein in the identification process, the identification information is used to verify an identity of the user, and
if the identity of the user is verified, the authorization process is performed.

* * * * *

UNITED STATES PATENT AND TRADEMARK OFFICE
CERTIFICATE OF CORRECTION

| | | |
|---|---|---|
| PATENT NO. | : 10,872,480 B2 | Page 1 of 4 |
| APPLICATION NO. | : 16/342627 | |
| DATED | : December 22, 2020 | |
| INVENTOR(S) | : Carlo Stefanelli et al. | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Figure 1:
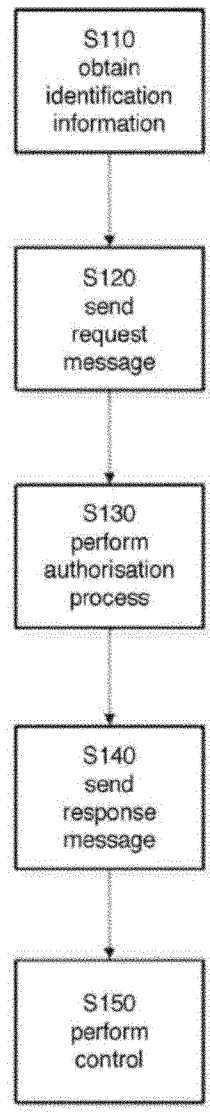
FIG. 1 is a flow diagram according to one embodiment of the present invention.
Figure 5:
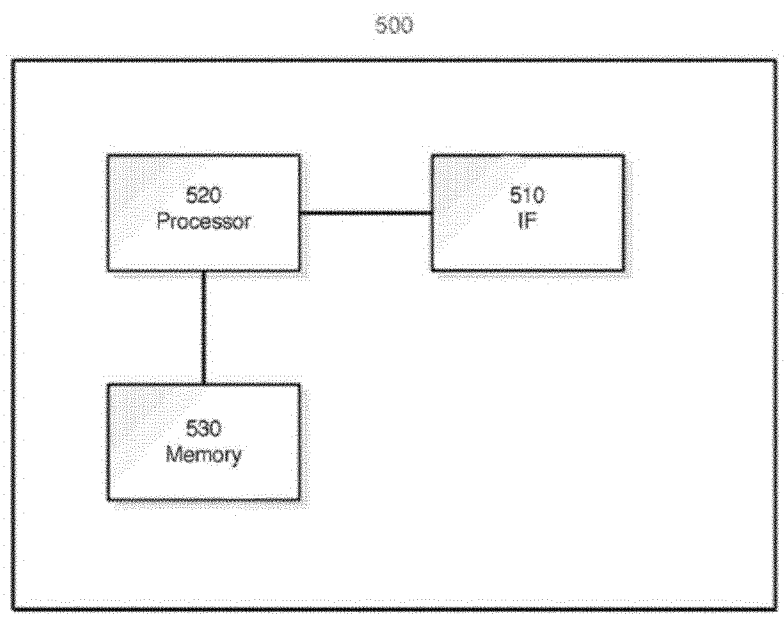

Please replace Figs. 1 and 5 with Figs. 1 and 5 as shown on the attached pages.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*

(12) United States Patent
Stefanelli et al.

(10) Patent No.: US 10,872,480 B2
(45) Date of Patent: Dec. 22, 2020

(54) METHOD, DEVICES AND SYSTEM FOR IMPROVED CONTROL OF A SERVICE MEANS FOR DEDICATED USE IN INFRASTRUCTURES

(71) Applicant: TARGA TELEMATICS S.p.A., Treviso (IT)

(72) Inventors: Carlo Stefanelli, Treviso (IT); Alberto Falcione, Treviso (IT); Nicola De Mattia, Treviso (IT)

(73) Assignee: TARGA TELEMATICS S.p.A., Treviso (IT)

( * ) Notice: Subject to any disclaimer, the term of this patent is extended or adjusted under 35 U.S.C. 154(b) by 0 days.

(21) Appl. No.: 16/342,627

(22) PCT Filed: Oct. 17, 2017

(86) PCT No.: PCT/IB2017/001328
§ 371 (c)(1),
(2) Date: Apr. 17, 2019

(87) PCT Pub. No.: WO2018/073642
PCT Pub. Date: Apr. 26, 2018

(65) Prior Publication Data
US 2019/0236875 A1    Aug. 1, 2019

(30) Foreign Application Priority Data
Oct. 17, 2016   (IT) .................... 102016000104064

(51) Int. Cl.
*G07C 9/00* (2020.01)
*G06F 21/31* (2013.01)
(Continued)

(52) U.S. Cl.
CPC ............ *G07C 9/00309* (2013.01); *B64F 1/32* (2013.01); *G06F 21/31* (2013.01); *G07C 9/27* (2020.01);
(Continued)

(58) Field of Classification Search
CPC ... G07C 9/00309; G07C 9/00103; B64F 1/32; G06F 21/31
See application file for complete search history.

(56) References Cited

U.S. PATENT DOCUMENTS 9,373,201 B2    6/2016    Jefferies et al.
9,376,090 B2    6/2016    Gennermann
(Continued)

FOREIGN PATENT DOCUMENTS

WO    WO 2005/021340 A1    3/2005
WO    WO 2013/133791 A1    9/2013

OTHER PUBLICATIONS

IT 201600104064, Jul. 14, 2017, Italian Search Report and Written Opinion.
(Continued)

*Primary Examiner* — Nabil H Syed
(74) *Attorney, Agent, or Firm* — Wolf, Greenfield & Sacks, P.C.

(57) ABSTRACT

The present invention relates to a method, devices, and computer program for controlling a semi-movable service means dedicated to a use in airport infrastructures. According to the method, there are envisaged steps of obtaining (S110), in the client device, identification information of a user from an external device; sending (S120), in the client device, a request message to the server device on the basis of the obtained information; performing (S130), in the server device, an authorisation process for the semi-movable means on the basis of the received request message; sending
(Continued)